April 23, 1957 R. T. BURNETT 2,789,666
AUTOMATIC BRAKE ADJUSTOR
Filed April 8, 1954 2 Sheets-Sheet 1

INVENTOR.
RICHARD T. BURNETT
BY Cecil J Arens

ATTORNEY

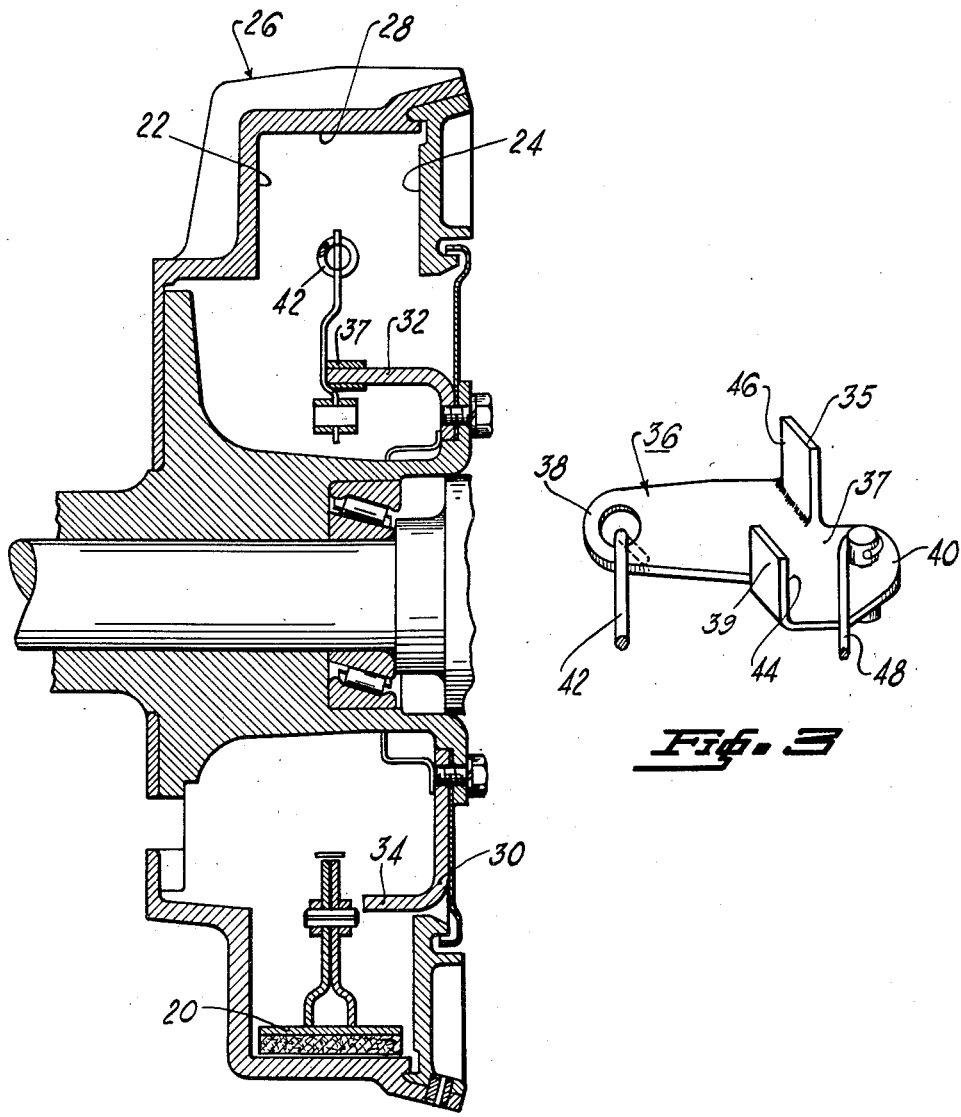

United States Patent Office 2,789,666
Patented Apr. 23, 1957

2,789,666

AUTOMATIC BRAKE ADJUSTOR

Richard T. Burnett, South Bend, Ind., assignor to Bendix Aviation Corporation, South Bend, Ind., a corporation of Delaware Application April 8, 1954, Serial No. 421,890

11 Claims. (Cl. 188—79.5)

This invention relates to an automatic brake adjustor and more particularly to an adjustor cooperable with a radially actuated friction-producing element.

A primary object of this invention is to provide an automatic adjustor of utmost simplicity embodying reliability and accuracy in performance.

A further object of the invention is to obtain an automatic adjustor which will not over-adjust the friction-producing element during an application of the brake.

The above and other objects and features of the invention will appear more fully hereinafter from a consideration of the following description, taken in connection with the accompanying drawings wherein an embodiment of the invention is illustrated by way of example.

In the drawings:

Figure 2 is a section view of the brake assembly taken on the line 2—2 of Figure 1;

Figure 3 is an isometric view of the automatic adjustor which may be used in combination with the illustrated brake assembly.

Figure 1:
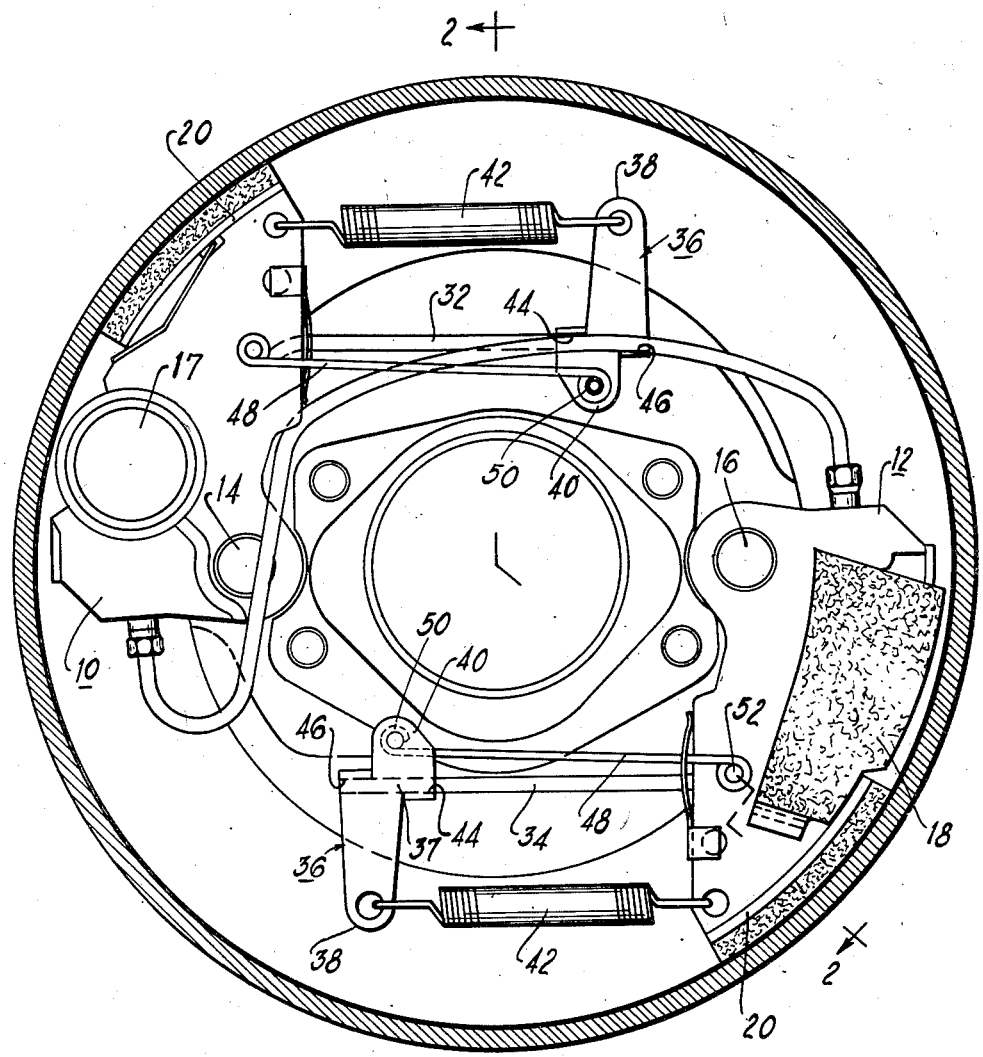
Figure 1 shows a side elevation of a brake assembly provided with two of my novel brake adjustors. A part of the brake drum is removed, and the disk element of the friction unit on the left hand side of Figure 1 is detached.

As the description of the illustrated drawings proceeds, it will be apparent to those skilled in the art that various changes and modifications of the adjusting mechanism may be made without departing from the underlying principles of the invention.

The brake assembly shown in Figure 1 includes two friction units 10 and 12 which are pivotally associated with anchor members 14 and 16 at opposite sides of the brake assembly. The friction units 10 and 12 each include axially-reciprocable pistons 17 which carry friction elements 18 and a radially applied shoe portion 20 which is actuated by the torque reaction from engagement of the friction elements 18 with two spaced sides 22 and 24 of a rotatable member 26. The pistons 17 are moved axially (a direction normal to the plane of the drawing Figure 1) to bring friction elements 18 into forcible engagement with sides 22 and 24 of the rotatable member.

The anchoring load from the application of the disk elements 18 against the spaced sides 22 and 24 and the anchoring load from the radial application of the shoes 20 against surface 28 is taken by anchors 14 and 16. The torque-taking member 30 to which the anchors 14 and 16 are secured, is fastened to a nonrotatable member and is provided with two transversely located flanges 32 and 34 formed along the periphery of the torque-taking member 30.

The present invention is primarily concerned with adjustment of the shoe portion 20 of each of the units. Each of the shoe portions 20 of the friction units 10 and 12 is provided with an automatic adjustor 36 consisting of a stamping having a U-shaped cross section portion 37 intermediate remote ends 38 and 40. The automatic adjustors 36 are slidably received on flanges 32 and 34. Sides 35 and 39 of the U-shaped portion of the adjustor lie adjacent to opposite sides of its associated flange to permit sliding movement of the adjustor thereon. A helical return spring 42 is fastened between the shoe portion of the friction unit and the end 38 of the adjustor. The return spring 42 exerts a turning moment on the adjustor rotating the sides 35 and 39 of the U-shaped portion 37 of the adjustor so that edges 44 and 46 engage opposite sides of its associated flange thus resisting relative sliding movement between the adjustor and flange.

A strut 48 is operatively interconnected between each of the units 10 and 12 and end 40 of automatic adjustors 36. Lost motion is provided at 50 between the connection of strut 48 with the end 40 of adjustor 36.

As best shown in Figure 1, the spring 42 is fastened between one end of the adjustor and the shoe portion of the friction unit. The spring 42 exerts a retracting force on the shoe portion and also causes cocking of the adjustor on the flange associated therewith. When the shoe portion of the unit is in retracted position, the spring force exerted on the unit is translated to end 40 of the adjustor by the strut 48. The spring and strut thus exert, at opposite ends of the adjustor, complementary cocking forces which prevent sliding of the adjustor 36 on the flange.

The springs 42 cause clockwise pivotal movement of units 10 and 12 about anchors 14 and 16 yieldably urging the shoe portions of the units to retracted position; the extent of clockwise pivotal movement of the unit is limited by contact of the strut 48 with the adjustor which is cocked to prevent further clockwise movement of the unit.

Adjustment of the shoe portions of each of the units is accomplished in the same manner. The following detailed description of the adjustor in combination with unit 12 applies equally to both.

In operation, the shoe portion 20 is radially applied against surface 28 of the drum, and the strut 48 is moved toward the right if the extent of actuation of the shoe exceeds the lost motion 50 between the strut 48 and end 40. When the unit 12 pulls the strut 48 toward the right, the strut 48 exerts a cocking force on adjustor 36 which is opposed to that exerted by the spring 42 at point 38.

The force actuating the shoe portion of unit 12 is sufficient to overcome the load of spring 42 and hence diminishes the friction engagement of the adjustor 36 with flange 34 at edges 44 and 46. When the extent of actuation of the unit exceeds the lost motion 50 the strut pulls on the adjustor with a force opposite that produced by spring 42; hence, there is produced a sliding movement of the adjustor 36 toward the right. The movement of the adjustor 36 continues toward the right until the shoe portion 20 of the unit 12 is fully applied against the surface 28 of drum 26.

When the applying effort on shoe portion 20 of unit 12 is released spring 42 yieldably urges the shoe to retracted position and the extent of retraction of the shoe portion of unit 12 from applied position is equal to the lost motion 50 between strut 48 and the end 40 of the adjustor, the strut 48 abutting end 40 to define the retracted position of the shoe. It is apparent that this lost motion is direcly related to the clearance between the shoe and surface 28 of drum 26. When the shoe is retracted by spring 42, strut 48 and spring 42 again exert complementary turning moments on adjustor 36 causing relatively high frictional engagement of the adjustor and flange at edges 44 and 46 to prevent further sliding movement between the adjustor 36 and the flange 34.

From a consideration of the operation of the device it will be seen that sliding movement of the adjustor 36 on the flange 34 is produced by the strut 48 when the distance of the shoe from retracted to applied position exceeds the lost motion between the adjustor 36 and the strut 48. Sliding movement of the adjustor 36 imposed thereon by the strut 48, determines the increments of adjustment by which the retracted position of the shoe is successively changed to compensate for the extent of lining wear on the shoe portion of friction-producing unit 12.

The return spring 42 yieldably urges the shoe portion to retracted position and further exerts a turning moment on the adjustor 36 preventing sliding movement between the adjustor and flange 34. The adjustor utilizes the return spring as a component part thus making for economy in number of elements necessary to accomplish automatic adjustment of the shoe portion of the unit.

During a reverse application the unit 12 pivots clockwise on anchor 16 and the friction between edges 44 and 46 and the flange is insufficient to absorb the anchoring load exerted thereon by clockwise movement of unit 12. Hence the adjustor is caused to slide toward the left by the strut 48, the unit 12 anchoring at point 52. The clearance of the shoe from the drum may now exceed lost motion 50, but the adjusted position of the shoe is re-established upon the first application of the brake with forward motion of the vehicle when the adjustor is pulled toward the right by strut 48.

In accomplishing the objects of the present invention various changes in the form and relative location of the components may be made to suit requirements.

I claim:

1. An automatic adjustor operatively connected to a friction-producing element and adapted to define the retracted position therefor, said adjustor comprising a lever having a U-shaped cross section portion between the remote ends thereof, said lever being slidably received on a fixed member and abutting opposite sides thereof, a resilient means fastened between one end of said lever and friction unit, a strut interconnecting the opposite end of said lever and friction unit, and a predetermined clearance provided in the fastening between said strut and lever for determining extent of retraction of said unit from an applied position.

2. An automatic adjusting mechanism operatively associated with a friction-producing element for determining the retracted position thereof according to extent of lining wear thereon, said adjusting mechanism comprising a fixed member, an adjustor constructed and arranged for abutting contact with opposite sides of said fixed member and slidably mounted thereon, a strut interconnecting the friction-producing element and adjustor on one side of said fixed member, a resilient means fastened between the friction-producing element and adjustor on the opposite side of said fixed member, said resilient means tending to turn said adjustor in a manner frictionally engaging abutting sides of said fixed member and adjustor to resist relative sliding movement therebetween, the force exerted by said resilient means on said friction-producing element being transmitted through said strut to cooperably impose a turning moment on said adjustor, and predetermined clearance in the operative connection of said strut and friction-producing element establishing extent of retraction of said friction-producing element, movement of the friction-producing element toward applied position acting through said strut to oppose the turning moment exerted on said adjustor by said resilient means and relieving frictional interengagement of said adjustor and fixed member to permit relative sliding movement therebetween when said clearance in the operative connection of said strut and friction-producing element is taken up.

3. An automatic adjustor in cooperation with a radially-applied friction element comprising fixed means, an adjustor member slidably received on said fixed means, a resilient means and strut operatively interconnected between the friction element and said adjustor member to cooperably impose cocking of said adjustor on said fixed means to resist sliding movement therebetween, and a clearance in the operative connection between the friction element and said strut determining the extent of retractile movement of the friction element, said strut opposing turning of said adjustor by said resilient means to permit sliding of said adjustor on said fixed means when the friction element is actuated toward an applied position through a distance in excess of said clearance.

4. For use in combination with a radially-applied friction element, a fixed member, an adjustor slidably received on said fixed member, a return spring urging the friction element to retracted position and imposing a cocking of said adjustor on said fixed means to resist relative sliding movement therebetween, and a strut having operative interconnection with lost motion therein between said friction element and adjustor, said strut abutting with said adjustor to define the retracted position of the friction element with the lost motion provided therein determining the extent of retraction of the friction element, said strut being further adapted to cause sliding movement of said adjustor on said fixed means to equal the increments of adjustment of the friction element.

5. An automatic adjusting mechanism in cooperation with a radially-applied friction-producing element, comprising a fixed member, an adjustor slidably received on said fixed member, means yieldably retracting the friction-producing element and imposing a cocking of said adjustor on said fixed member to resist sliding movement therebetween, and a strut having operative connection provided with lost motion therein between the friction-producing element and said adjustor, said strut contacting said adjustor to determine the retracted position of the friction element and causing sliding movement of said adjustor on said fixed member to equal the increments of adjustment of the friction-producing element.

6. For defining the retracted position of a friction-producing element, an automatic adjustor slidably received on a fixed member, means yieldably imposing a cocking force on said automatic adjustor to resist movement thereof, and means defining the retracted position of the friction-producing element by abutment with said automatic adjustor, said last mentioned means having operative interconnection with the friction-producing element provided with lost motion therein determining clearance of the friction element from an applied position, said last mentioned means causing sliding movement of said automatic adjustor equaling the increments of adjustment of the friction-producing element when extent of actuation of the friction-producing element exceeds the lost motion between the friction-producing element and said last mentioned means.

7. An automatic adjustor comprising a lever slidably received on a fixed member, resilient friction element retracting means operatively connected to said lever and exerting a cocking action thereon to prevent movement of said lever, and a strut operatively connected to said lever, said connection having lost motion therein, said strut being adapted to cause sliding of said lever when urged in a direction opposing the cocking action of said resilient means on said lever.

8. In a brake, a friction unit including axially movable first friction means and a radially applied second friction means actuated by torque reaction from application of said first friction means, an automatic adjusting mechanism for said second friction means comprising a lever, a U-shaped cross section portion of said lever intermediate the remote ends thereof, fixed means slidably receiving said U-shaped portion, resilient means fastened between one remote end of said lever and the friction unit associated therewith, force transmitting means interconnecting the other remote end of said lever and said friction unit, and lost motion in the interconnection of said lever and unit through said force transmitting means for determining clearance of said second friction means from an applied position.

9. A brake including a friction unit consisting of axially and radially applied friction elements and an automatic adjustor cooperable with said radially applied friction element, said automatic adjustor comprising a fixed member, a lever slidably received on said fixed member, resilient means fastened between said friction unit and lever for producing frictional resistance to sliding of said lever on said fixed member, and force transmitting means interconnecting said lever and unit for causing sliding of said lever to successive adjusting positions.

10. A friction unit including axially applied disk brake elements, a radially applied shoe brake element and automatic adjusting mechanism cooperable with said shoe brake element and comprising a lever slidably received on a fixed member, a yieldable interconnection between said unit and lever for producing frictional resistance to sliding movement of said lever, and a rigid interconnection between said lever and unit for producing sliding of said lever to successive adjusting positions upon movement of said shoe brake element toward an applied position in excess of a predetermined distance.

11. An adjustor for a movable friction element comprising a fixed member, a canted member slidably associated with said fixed member, a return spring, which is fastened between the friction element and the canted member to develop frictional contact between said canted member and fixed member whereby the canted member is held relatively to said fixed member, and a force transmitting member fastened between said canted member and friction element which is arranged to oppose the turning produced by said return spring, thereby causing the canted member to slide on the fixed member to successive adjusting positions which determine the retracted position of the friction element.

References Cited in the file of this patent
UNITED STATES PATENTS

| | | |
|---|---|---|
| 2,392,956 | Thibeault | Jan. 15, 1946 |
| 2,670,058 | Landrum | Feb. 23, 1954 |